May 12, 1970 — J. H. KRESS — 3,511,131
HYDRAULIC MOTOR

Filed June 24, 1968 — 3 Sheets-Sheet 1

INVENTOR.
J. H. KRESS

May 12, 1970  J. H. KRESS  3,511,131
HYDRAULIC MOTOR

Filed June 24, 1968  3 Sheets-Sheet 2

INVENTOR.
J. H. KRESS

INVENTOR.
J. H. KRESS

United States Patent Office 3,511,131
Patented May 12, 1970

---

3,511,131
HYDRAULIC MOTOR
James Henry Kress, Cedar Falls, Iowa, assignor to Deere & Company, Moline, Ill., a corporation of Delaware
Filed June 24, 1968, Ser. No. 739,482
Int. Cl. F01b *15/00*
U.S. Cl. 91—176                                11 Claims

ABSTRACT OF THE DISCLOSURE

A hydraulic vehicle wheel motor has a housing attached to the vehicle frame and an axial shaft attached to the wheel and journaled in the housing. The shaft carries a hub having a number of radial cylinders in which pistons reciprocate in response to alternate pressurization and exhaust of the cylinder, the outer ends of the piston carrying roller-type cam followers which engage a generally sinusoidal cam surface on the inner periphery of the housing to rotate the shaft as the pistons reciprocate. Fluid pressure is supplied to the rotating hub through a radial valve face opposite a stationary valve manifold which is biased against the hub valve face.

BACKGROUND OF THE INVENTION

This invention relates to hydraulic motors, and more particularly to high-torque, low-speed motors of the type having a number of radial pistons, which engage the inner periphery of a generally sinusoidal cam ring having a different number of cam lobes than the number of pistons to cause rotation of one element of the motor relative to the other in response to reciprocation of the pistons.

Such hydraulic motors, sometimes referred to as cam-lobe motors, have not been widely utilized, although recently such motors have found some use, particularly in Europe, in low-speed, high-torque applications. One such application has been for wheel motors in hydraulically driven vehicles, the motors being mounted in the hub of the wheel. Since the motors are relatively high-torque, low-speed motors, they have not required reduction gearing between the output of the motor and the wheel, thereby providing a distinct advantage over most hydraulic motors in such applications.

The reciprocation of the pistons, which causes the relative rotation between the motor elements, is, of course, accomplished through alternate pressurization and exhaust of the cylinders in which the pistons reciprocate. Conventionally, the pressurization and exhaust of the cylinders is controlled through a rotating pintle-type valve means within the motor, the valve means generally being in the form of an axial shaft or sleeve having pressure and sump passages alternately connected to radial passages, which intermittently communicate with corresponding passages connected to the cylinders as the rotor rotates. However, such an arrangement inherently cannot be adjusted as wear occurs between the two relatively rotating valve parts, so that leakage increases with motor use.

A radial valve plate, with axially extending passages intermittently communicating with axial passages in the stationary valve part, permits axial adjustment of one valve part relative to the other to compensate for wear between the radial faces of the valve parts wherein the relative rotation occurs. However, without compensation the hydraulic forces acting on the valve parts tend to separate the valve parts at their radial faces, permitting excessive valve leakage.

Frequently, when such motors are utilized in vehicles, they are provided as auxiliary drives to augment more conventional drives in certain circumstances, and thus such motors are only intermittently used. Also, during towing of the vehicle, the motors are not used, and it is desirable that the pistons be lifted out of engagement with the cam ring to avoid excessive noise from the motor and wear and heat on the motor parts. Also, if the pistons remain in engagement during towing at a relatively high speed, the motor acts as a pump, pumping a relatively large volume of fluid, the disposition of which creates a problem. Thus, it is also desirable that means be provided for disengaging the motor when the vehicle is being towed.

It has been proposed that the motor housing be pressurized to a greater pressure than the pressure in the cylinders, forcing the pistons inwardly away from the cam and thereby disengaging the motor. Of course, a source of fluid pressure is required to so pressurize the motor housing. While the engine driven main pressure source or pump in the hydraulic drive offers a convenient source of such pressure, this necessitates the operation of the engine to maintain the motor in a disengaged condition when the vehicle is being towed.

SUMMARY OF THE INVENTION

According to the present invention, there is provided an improved design for a cam-lobe-type hydraulic motor wherein axial-type valve means are provided for controlling the fluid pressure in the respective cylinders, the valve means having axially extending passages in relatively rotating parts communicating through opposite radial faces and also including means for biasing the opposite radial faces of the valve parts against one another to minimize leakage in the valve means. More specifically, hydraulic means, responsive to the fluid pressure supplied to the motor, are utilized to bias the relatively rotating valve parts toward one another, so that the biasing force is a function of the hydraulic pressure supplied to the motor, providing a greater biasing force at higher pressures.

Another feature of the invention resides in the provision of such hydraulic means for counterbalancing the hydraulic forces acting on the valve means, which inherently tend to separate the two relatively rotating valve parts.

Still another feature of the motor resides in the provision of a thrust bearing which absorbs all the axial forces between the relatively rotating motor portions, so that the bearing means which journal the relatively rotating motor portions are relieved of all axial forces.

Another important feature of the invention resides in the provision of means for lifting the pistons from the cam ring when the motor is in use and the motor is driven by some external force. More specifically, a hydraulic circuit is provided, which includes a control valve, that directs the output pressure from the motor to the motor housing when the motor is being driven and functioning as a hydraulic pump, while disconnecting the cylinders in the motor from the pressure source, so that the pressure in the cylinders is generally less than the pressure in the housing to force the pistons inwardly away from the cam ring.

DESCRIPTION OF THE PREFERRED EMBODIMENTS

Figure 1:
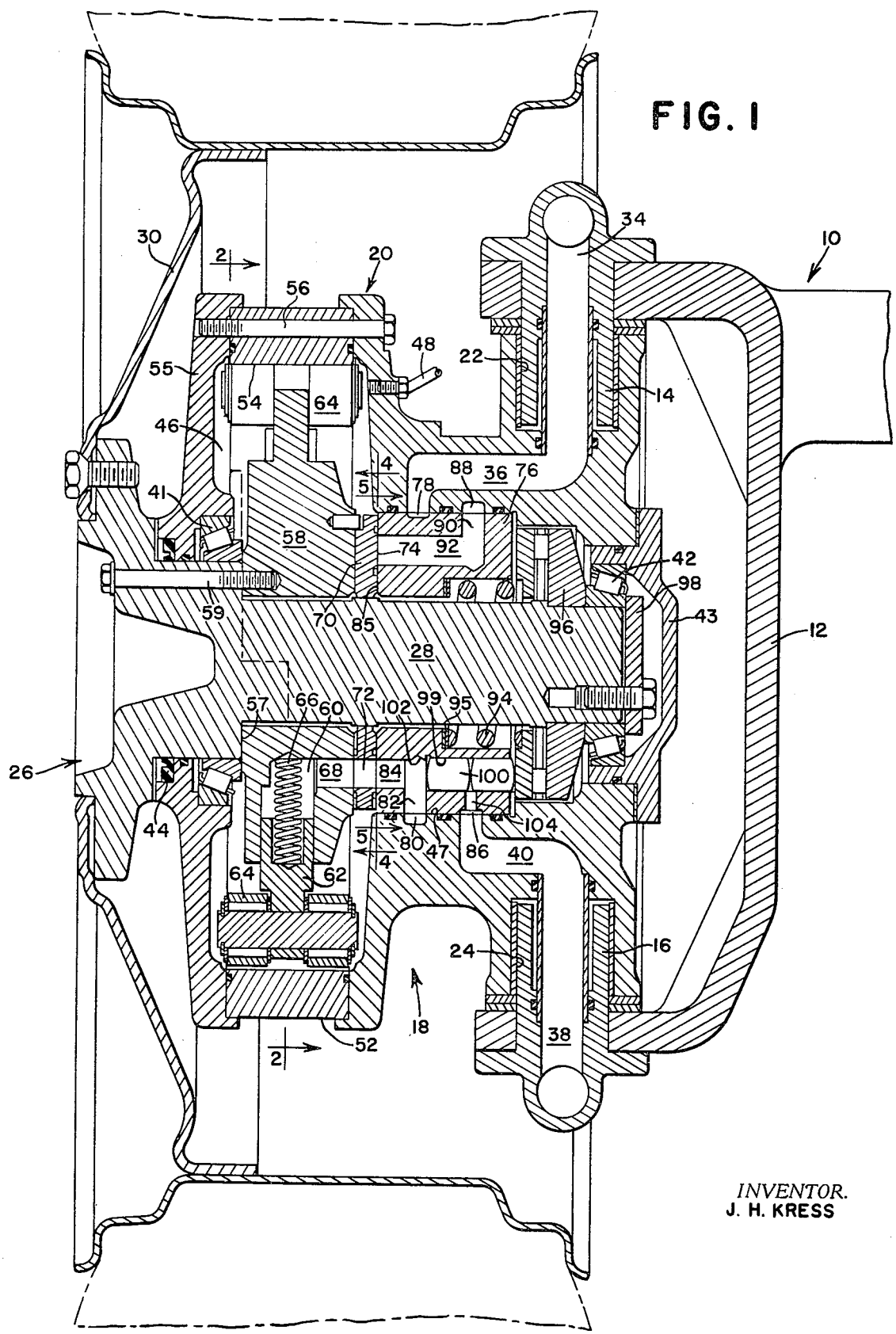
FIG. 1 is an axial section through the hydraulic motor and the steerable front wheel of the vehicle in which the motor is mounted, the section of the motor being taken generally along the line 1—1 of FIG. 2.

The invention is embodied in a vehicle, such as a tractor or the like, having a steerable axle structure, only one end of which is shown in FIG. 1 and indicated generally by the numeral 10. The axle structure has a yoke 12 at its outer end, the vertically separated arms of which respectively carry vertically aligned top and bottom pivot pins 14 and 16 respectively. A hydraulic wheel motor, indicated generally by the numeral 18, is mounted for steering articulation on the pivot pins and includes a rotationally fixed portion or housing 20, including upper and lower, vertically aligned sockets 22 and 24, which respectively receive the top and bottom pivot pins 14 and 16, so that the motor is free to swing about the vertical axis of the sockets and the pivot pins.

The motor also includes a shaft or rotating portion 26, which rotates relative to the housing 20, and includes an axial shaft 28 having its outer end affixed to a conventional wheel 30, whereby rotation of the shaft 26 relative to the housing 20 drives the wheel 30.

Figure 2:
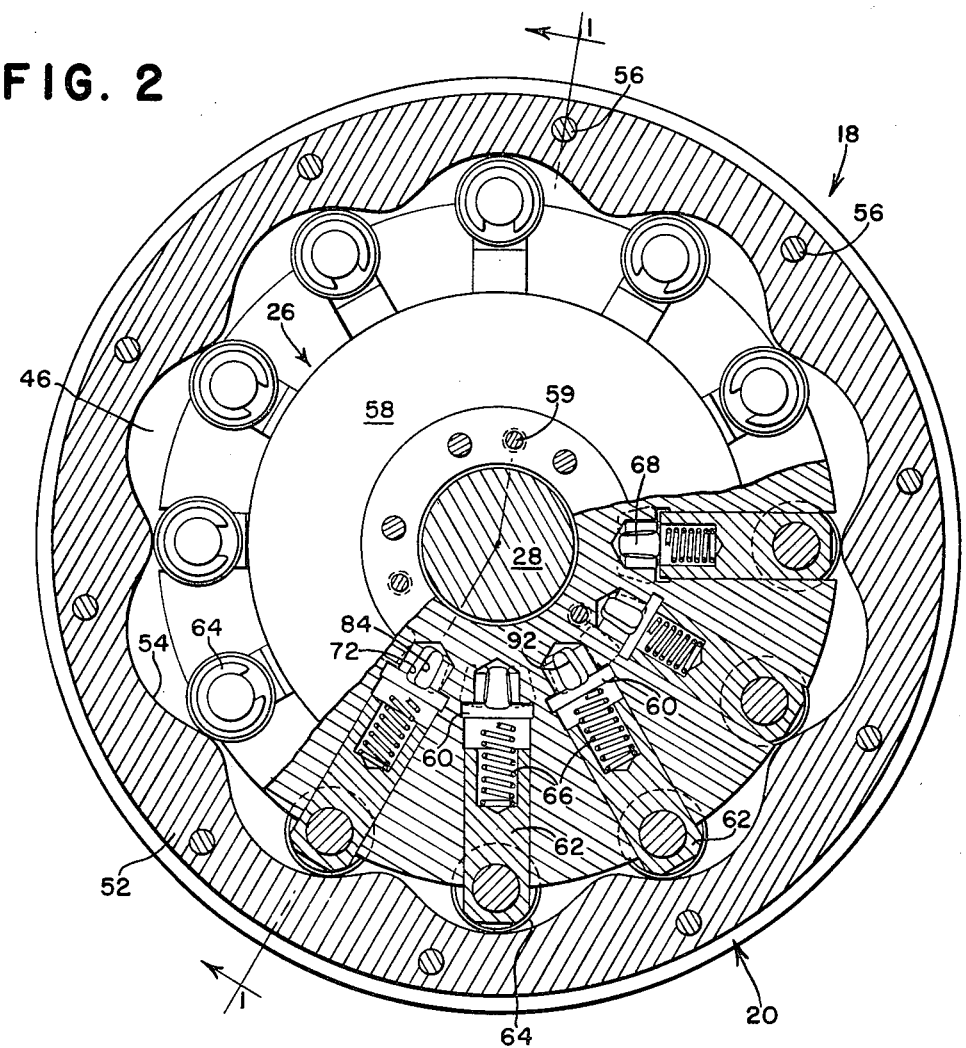
FIG. 2 is a cross-section of the motor as viewed generally along the line 2—2 of FIG. 1.
Figure 3:
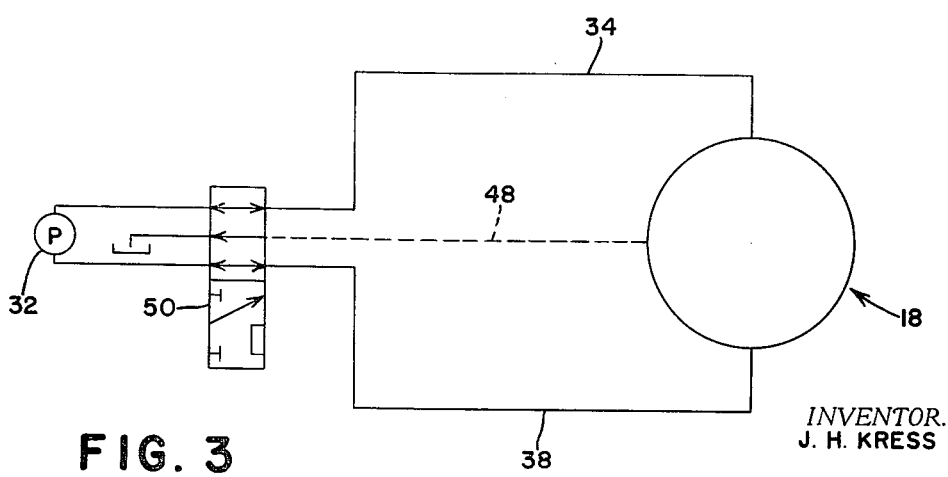
FIG. 3 is a schematic illustration of the hydraulic circuit in which the motor is utilized.
Figure 4:
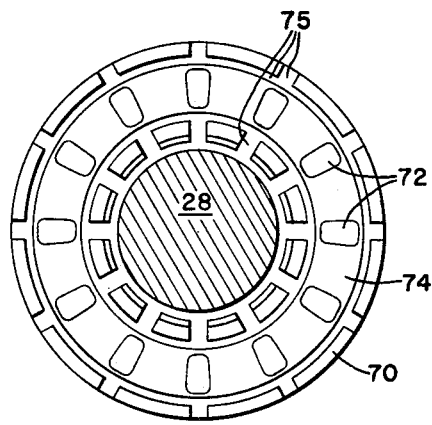
FIG. 4 is a section viewed along the line 4—4 of FIG. 1.

The wheel motor 18 is included in a hydraulic circuit, schematically illustrated at FIG. 3, only those portions of the circuit relevant to the invention being illustrated. The circuit includes a mean hydraulic pump 32, preferably driven by the vehicle engine and connected to the motor through an inlet line 34, which extends through the upper pivot pin 14 and communicates with an inlet passage 36 in the housing, and an outlet line 38 extending through the lower pivot pin 16 and communicating with an outlet passage 40 in the housing. Preferably, the fluid pressure supply is reversible to cause reverse rotation of the motor, in which case the line 34 serves as the fluid outlet, while the line 38 is the pressure inlet. As hereinafter described, when the line 34 is pressurized, the shaft portion 26 rotates in a clockwise direction as viewed in FIG. 2.

The shaft 28 is journaled in the housing 20 adjacent its outer and inner ends by means of a pair of tapered roller bearings 41 and 42. The housing is fluid tight, having its inner axial opening closed by a circular plate 43 and its outer openings closed by the shaft 28, which extends through the opening and is sealed by a rotary seal 44 outwardly of the outer bearing 41. The housing forms a generally cylindrical outer chamber 46 adjacent its outer end, and an adjacent smaller diameter cylindrical inner chamber 47. The outer chamber 46 has a drain line 48, normally connected to the reservoir during operation of the motor by a control valve 50, which also connects the inlet and outlet lines 34 and 38 to the pressure source 32 during normal operation of the motor. The valve 50 is shiftable into an alternate position wherein it blocks the connection between the inlet and outlet lines and the pressure source, while connecting the inlet 34 to the reservoir and the outlet line 38 to the housing chamber via the drain line 48.

The periphery of the chamber 46 is formed by an annular cam ring 52 having a generally sinusoidal inner cam surface 54 forming ten identical cam lobes at equal angular intervals around the cam surface. The cam ring forms a part of the housing 20, and is rigidly clamped between a housing end plate 55 and the main housing part by a plurality of axially extending bolts 56 extending through the housing and the cam ring and threaded into the end plate 55.

The shaft 28 is provided with a shoulder 57 adjacent its outer end, and an annular hub 58 is coaxially attached to the shaft abutting the shoulder 57 by a number of axially extending fasteners 59. The hub 58 is provided with twelve radially extending cylinders 60, which are open outwardly and spaced at equal 30° angular intervals around the periphery of the hub. A position 62 is reciprocatably mounted in each cylinder, each piston projecting radially from the cylinder and carrying a roller-type cam follower 64 at its outer end. Each cam follower is formed by a pair of rollers mounted on a shaft carried by the piston parallel to the axis of the motor, the rollers being biased toward rolling engagement with the cam surface 54 via springs 66 operative between the inner end of each cylinder and its respective piston.

An axial passage 68 connects the inner end of each cylinder 60 to an annular valve plate 70 disposed at the inner end of the hub. The valve plate 70 is pinned to the hub for rotation therewith and has twelve axially extending passages or ports 72 placed at equal angular intervals around the valve plate, each port being aligned with an axial passage 68 in the hub. The valve plate ports 72 terminate in a radial valve face 74 provided with a number of leakage grooves 75, although the area around each port 72 is provided with a sealing surface.

Figure 5:
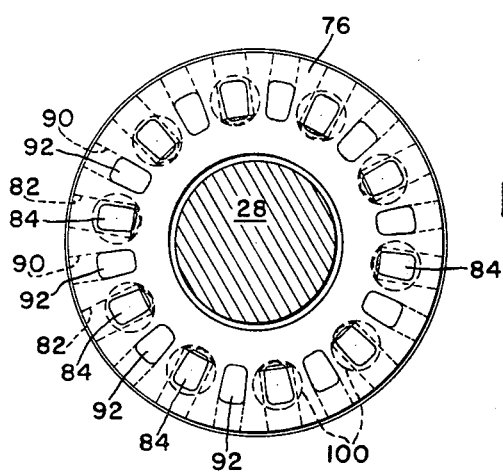
FIG. 5 is a section viewed along the line 5—5 of FIG. 1.

An annular valve manifold 76 is mounted in the smaller or inner chamber 47 of the housing around the shaft 28, the manifold having substantially the same outer diameter as the diameter of the chamber and being rotationally fixed therein. The valve manifold has an annular groove 78 around its outer periphery communicating with a similar annular groove 80 about the periphery of the housing chamber, which in turn is connected to the inlet passage 36 in the housing. The manifold groove 78 is connected to ten radial passages 82 spaced at equal angular intervals in the manifold, each radial passage being connected in turn to an axial passage or port 84 terminating in the outer radial face 85 of the manifold, opposite the radial face 74 of the valve plate 70. Similarly, the manifold has an annular outlet groove 86 about its periphery axially spaced from the intake groove 78 and communicating with a corresponding annular groove 88 in the housing, the groove 88 in turn being connected to the housing outlet passage 40. The manifold also has ten radial passages extending inwardly from the groove 86 at equal angular intervals, each radial passage 90 communicating with an axial passage or port 92 in the manifold, also terminating at the radial face 85. The ports 84 and 92 are disposed in a circular relationship on the radial face 85 at equal angular intervals in an alternating relationship, as best seen in FIG. 5.

A helical compression spring 94 is coaxially mounted on the shaft 28 and operates between the manifold 76 and a thrust bearing 96 coaxially mounted on the shaft and restrained from axial shifting thereon by an end plate 98 bolted to the end of the shaft and clamping the thrust bearing 96 through the inner race of the bearing 42. The compression of the spring 94 is adjusted by shims 95, so that the spring applies a predetermined amount of axial force on the manifold biasing it toward the valve plate 70.

A cylindrical bore 99 extends between the inner end of the manifold and each axial inlet passage or port 84 and a pair of cylindrical pistons 100 are mounted for reciprocation in each bore 99, the inward movement of the piston being limited by engagement with the thrust bearing 96, while the outward movement of the pistons is limited by a lip 102 at the outer end of the bore adjacent the inner end of the passage or port 84. The ten cylindrical bores, and their corresponding pistons have a somewhat greater cross section than the respective ports or axial passages 84 with which they are aligned, and the ends of the pistons 100 are rounded so that they are slightly separated at their peripheries when their ends are in contact. A radial passage 104 in the manifold connects the space between each set of adjacent pistons to the outlet manifold groove 86.

In operation, when the wheel motor is used to drive the vehicle forwardly, fluid under pressure is supplied to the motor through the inlet line 34, which pressurizes the inlet passage 36 in the housing and its annular groove 80. The fluid pressure in the groove 80 is transmitted to the ten axial passages or ports 84 in the valve manifold and when one of the valve plate ports 72 is opposite a port 84, the fluid pressure is transmitted to the cylinder 60 connected to that particular valve plate port. The relationship between the manifold and the valve plate is such that each cylinder is initially pressurized when its piston is at its innermost position wherein the cam follower is at the peak at one of the cam lobes. This can, perhaps, be best appreciated by referring to FIG. 2, wherein the piston in the three o'clock position is fully retracted and its valve plate port 72, which is aligned with the passage 68, approaches communication with the pressurized port 84 through the valve manifold. A slight rotation of the shaft and hub portion relative to the housing then connects the cylinder of the three o'clock piston to the pressure source while the cam follower is on the outwardly inclined portion of the cam surface, so that extension of the piston causes the shaft portion of the motor to rotate in a clockwise direction.

When said piston is half-way extended, the valve plate port is in substantial alignment with the pressurized port on the manifold, and further rotation of the shaft portion of the motor starts to move the port 72 past the pressurized manifold port. When the piston is fully extended, and the cam follower engages the cam surface at the bottom or outermost part of the cam lobe, the valve plate port has just moved past the pressurized port of the manifold and is almost in communication with the adjacent manifold port 92, which is connected to the exhaust line 38 through the radial passage 90, the annular groove 88 in the housing, and the outlet passage 40 in the housing. At this point, other pistons of the motor are in their pressure stroke, since there are twelve pistons and only ten cam lobes. In the illustrated embodiment, the diametrically opposed pistons are always in the same phase of their stroke. Thus, the radial forces on the shaft are balanced.

As is apparent from FIG. 2, when six of the pistons are in the extension portion of their stroke, the other six pistons are retracting, and of the six pistons that are extending, only two will be in the same phase of their stroke. The cam surface is preferably designed so that a relatively constant torque is provided.

As previously described, when each piston reaches its maximum extension, its cylinder approaches communication with an exhaust port in the manifold, and as the piston retracts due to the cam follower moving along the inwardly inclined surface of the cam surface, the fluid in the cylinder is ported to the outlet line 38. As the cam follower approaches the peak of the next cam lobe, such as the piston shown in the four o'clock position in FIG. 2, the valve plate port leaves the corresponding exhaust port 92 in the valve manifold, so that the above cycle is again repeated. Thus, since there are ten cam lobes, the cycle is repeated ten times for each revolution of the shaft, so that each revolution of the shaft requires a substantial quantity of pressurized fluid, providing a relatively slow output speed with high torque.

Since the pressurized passages 82 and 84 in the valve manifold open onto the radial face 85, there would normally be a hydraulic imbalance, urging the valve manifold away from the valve plate 70, the magnitude of the imbalance being a function of the pressure acting on and about the pressure port areas. Since this force tends to separate the manifold from the valve plate, means are provided for counterbalancing this force.

First, the spring 94 acts between the thrust bearing 96 and the valve manifold, exerting a constant force which urges the manifold toward the valve plate (to the left in FIG. 1). However, if the spring force were large enough to counterbalance the hydraulic force at high pressure, the valve manifold would be overbalanced at low pressure, the relatively large force urging the manifold against the valve plate causing excessive frictional pressure. Thus, the spring is selected and adjusted by means of the shims 95 to approximately provide a force which urges the manifold against the valve plate to insure intimate contact of the valve faces at low pressure and to thereby minimize leakage without creating an excessive frictional force between the relatively rotating manifold and valve plate.

The hydraulic imbalance is hydraulically compensated for by means of the pistons 100, which have a slightly greater cross sectional area than the effective pressure area of the ports 84. The hydraulic force on the pistons 100 is thus greater than the imbalance and is transmitted to the thrust bearing 96, the inside race of which is rigidly clamped to the shaft 28, and since this force is subtracted from the force urging the manifold to the right, the net effect on the manifold is a biasing force toward the left, causing a seal at the valve faces.

The axial force of the manifold against the valve plate 70 is transmitted to the shoulder 57 on the shaft 28 through the hub 58. Thus, all the axial forces in the motor are transmitted through the thrust bearing 96 only, so that the bearings 41 and 42 are not subjected to these axial forces.

If the pressure supply is reversed, for reverse operation of the motor, so that the housing passage 40 is pressurized while the housing passage 36 is connected to the pump inlet, the pistons 62 will alternately be pressurized and exhausted in the reverse order from that described above, so that the hub 58 and the shaft 28 connected thereto will be driven in the opposite direction. The pressurization of the axial passages 92 produces the same hydraulic imbalance on the valve manifold as the previously described pressurization of the passages 84. However, the pressure in the passage 40 is also transmitted to the space between the pistons 100 via the passages 104, urging the adjacent pistons 100 in opposite directions. The left-hand piston 100 moves to the left and engages the lip 102 and thereby exerts an outward force on the manifold equal to the pressure times the area of the piston. This force, of course, slightly more than counterbalances the hydraulic imbalance force urging the manifold to the right, which is equal to the pressure times the cross sectional area of the ports 92. The right-hand piston 100 of each piston set again engages the thrust bearing 96 so that the counterbalancing force is again transmitted to the shaft through the thrust bearing only. Thus, the hydraulic imbalance on the valve manifold is identically counterbalanced regardless of the direction of operation of the motor.

Figure 6:
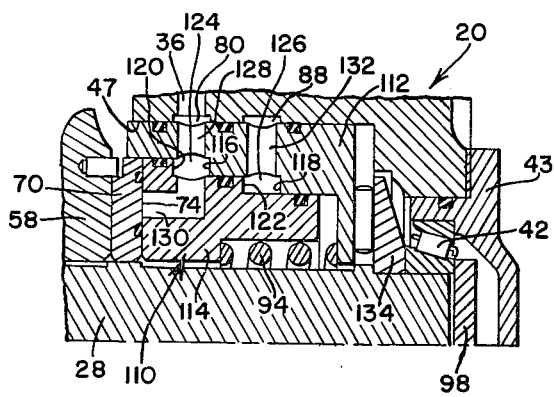
FIG. 6 is a partial section of the valve portion of the motor similar to a portion of FIG. 1, showing a slightly different embodiment of the valve manifold.

A slightly different means for hydraulically counterbalancing the valve manifold is shown in FIG. 6, wherein an annular manifold 110 is again coaxially mounted around the shaft 28 within the housing chamber 47, only the upper half of the manifold portion of the motor being shown in section in FIG. 6. The manifold 110 is made of two annular, stepped, mating parts, the stepped inner diameters of the outer part 112 mating with the stepped outer diameters of the inner part 114. The inner part 114 is capable of limited axial shifting relative to the outer part, the outer periphery of the part 112 substantially conforming to the inner periphery of the chamber 47 and being non-rotatable therein. The outer part 112 has two annular intermediate radial faces 116 and 118, which form the risers in the step construction, and the inner part 114 has similar intermediate radial faces 120 and 122 respectively of the same configuration as and opposite the radial faces 116 and 118. The intermediate radial faces of the two parts are axially separated, forming annular chambers 124 and 126 between the two parts.

The left-hand or larger diameter chamber 124 is connected to the housing inlet passage 36 through a radial passage 128 in the outer manifold part. The chamber 124 is also connected to the left-hand radial end face of the manifold through axial passages or ports 130 in the inner manifold part, the ports 130 corresponding to the inlet ports 84 in the previously described embodiment and being spaced around the manifold at 36° intervals.

The right-hand, or smaller diameter chamber 126 is connected to the annular outlet groove 88 in the housing and consequently to the outlet passage 40 through a second radial passage 132 in the part 112. The annular chamber 126 is also connected to a number of axial passages or ports in the inner manifold part (not shown), which correspond to the ports 92 in the previously described embodiment, the ports being arranged in an alternating relationship with the ports 130 in the same manner as the previously described ports 84 and 92.

In operation, when the manifold is pressurized for forward operation of the motor, a force equal to the effective pressure area of the ports 130 urges the inner part 114 away from the valve plate 70 (to the right in FIG. 6). However, the same pressure acts on the annular radial face 120, creating a force which is equal to the area of the face 120 times the pressure and urges the manifold part 114 to the left, to counterbalance the force which tends to separate the manifold from the valve plate 70. Of course, a similar force is created by the pressure acting on the radial face 116 of the outer manifold part, this force being transmitted to the shaft through a thrust bearing 134 via the inner race of the bearing 42 and the end plate 98. When the pressure supply is reversed for reverse operation of the motor, and the chamber 126 is pressurized, the hydraulic imbalance due to the axial manifold ports connected to the chamber 126 is counterbalanced by the pressure acting on the radial face 122, the opposite force due to the pressure acting on the face 118 of the outer manifold part 112 again being transmitted to the shaft 28 through the thrust bearing 124.

A significant distinction exists between the counterbalancing means shown in FIG. 6 and that previously described in FIG. 1. In FIG. 6 the total counterbalancing force is the sum of the forces resulting from pressures on areas 120 and 122. In FIG. 1 the total counterbalancing force is equal to the force resulting from whichever pressure is greater, that from port 34 or from port 38. This is important only when considerable backpressure develops in a circuit wherein separating forces are developed at the valve faces from both ports 84 and 74. These forces would be fully balanced by the piston means shown in FIG. 6 but would only be partially balanced by piston means shown in FIG. 1. In this latter case more counterbalancing force could be provided by increasing area of pistons 100 and/or increasing the spring force, so that moderate backpressures can be withstood.

Other alternative hydraulic counterbalancing means may be provided within the scope of the present invention. For example, rather than providing a pair of pistons 100 in each bore 99, double the number of bores could be provided with only one piston in each bore, the bores being disposed in a staggered arrangement and alternately being connected to the pressure and return ports. Also, the same number of bores could be provided as in FIG. 1, but a stepped piston could be substituted for the dual pistons shown in FIG. 1, the stepped piston functioning in the same manner as the piston 114 in FIG. 6.

In FIG. 3, the hydraulic circuit for the motor is shown in a condition wherein the motor is connected to the pressure source for operation in either direction, while the motor housing 20 is connected to the reservoir through the drain line 48 to bleed off the leakage oil. If it is desired to disconnect the motor, when the motor is designed for only intermittent use or when the vehicle is being towed, the valve 50 is shifted to completely disconnect the motor from the pressure source 32, while connecting the inlet line 34 to the reservoir. As the wheel turns, in this condition, the motor acts as a pump, drawing fluid from the reservoir through the line 34 and discharging the pressurized fluid to the line 38. The pressurized fluid is transmitted through the valve 50 and the drain line 48 back to the fluid-tight housing 20, and, as the pressure in the housing chamber 46 builds up, it forces the pistons 62 inwardly, away from the cam surface 54. Normally, the pistons will move inwardly until they are almost completely clear of the cam surface, the cam followers engaging only the peaks of the cam surface so that the pistons reciprocate only enough to compensate for leakage, which would tend to lower the pressure in the housing. Ordinarily, the amount of contact between the pistons and the cam surface would be insignificant from a functional standpoint. As is apparent, the use of the motor as a pressure source for disengagement of the motor permits disengagement of the motor even when the main pressure source is not operating, such as when the vehicle is being towed.

What is claimed is:

1. A hydraulic motor comprising: a housing portion including a generally cylindrical chamber; an annular cam surface formed by the inner periphery of said chamber and including a plurality of cam lobes; a shaft portion journaled in the housing portion and including a hub coaxially disposed within said chamber and haviig a radial valve face; a plurality of radial cylinders in said hub; a piston mounted for reciprocating movement in each of said radial cylinders in response to fluid pressure therein, each piston including cam follower means externally of the hub and engageable with the cam surface to cause rotation of one motor portion relative to the other in response to reciprocating movement of the pistons; a plurality of passages in the hub respectively connecting the closed end of each cylinder to the radial valve face of the hub for transmitting fluid to and from the respective cylinders; a first and a second housing passage means in the housing; a valve manifold mounted in the housing and having a first radial end face opposite the hub radial valve face, a second radial end face at its opposite end from the first radial end face, and first and second passage means respectively communicating with the first and second housing passage means and including a plurality of ports on the first radial end face intermittently communicating with the hub passages as the two motor portions rotate relative to one another to alternately and sequentially connect the cylinders to the first and second housing passages; a plurality of axially extending bores in the valve manifold connected at one end to the second radial end face, at the other end to the first passage means in the manifold, and at an intermediate portion of the second passage means in the manifold; and piston means in each bore responsive to fluid pressure in either of said manifold passage means whereby an axially directed hydraulic force is exterted on the manifold urging the first manifold radial end face toward the radial valve face on said hub.

2. The invention defined in claim 1 and including annular thrust bearing means coaxially mounted on the shaft portion opposite the second manifold end face, the piston means engaging said thrust bearing means and exerting an axial force thereon opposite the force exerted on the manifold in response to pressure in either of said passage means.

3. The invention defined in claim 1 wherein each piston means includes a pair of pistons mounted in their respective bores on opposite sides of the second passage means.

4. A hydraulic motor comprising: a housing portion including a generally cylindrical fluid-tight chamber; an annular cam surface formed by the inner periphery of said chamber and including a plurality of cam lobes; a shaft portion journaled in the housing portion and including a hub coaxially disposed within said chamber and having a radial valve face; a plurality of radial cylinders in said hub; a piston mounted for reciprocating movement in each of said radial cylinders in response to fluid pressure therein, each piston including cam follower means externally of the hub and engageable with the cam surface to cause rotation of one motor portion relative to the other in response to reciprocating movement of the pistons; a plurality of passages in the hub respectively connecting the closed end of each cylinder to the radial valve face of the hub for transmitting fluid to and from the respective cylinders; a first and a second housing passage means in the housing; a vlave manifold mounted in the housing, having a first radial end face opposite the hub radial valve face and a first and second passage means respectively communicating with the first and second housing passage means and having a plurality of ports on the radial end face intermittently communicating with the hub passages as the two motor portions rotate relative to one another to alternately and sequentially connect the cylinders to the first and second housing passage means; means biasing the first radial end face on the manifold toward the radial valve face on the hub; and hydraulic means connected to said chamber for selectively pressurizing the chamber to higher pressures than the pressure in said cylinders to shift the pistons radially inwardly, so that the cam follower means are at least partially disengaged from the cam surfaces during relative rotation between the motor portions.

5. The invention defined in claim 4 wherein said hydraulic means includes a fluid reservoir, a source of fluid pressure, a control valve means shiftable into a first position to connect the chamber to said fluid pressure source and a second position to connect the chamber to the reservoir.

6. The invention defined in claim 4 wherein the hydraulic means includes a reservoir and a control valve means selectively shiftable into a first position wherein it connects one housing passage means to the reservoir and the other housing passage means to said chamber, and a second position wherein it disconnects said one housing passage means from the reservoir and the other housing passage means from the chamber.

7. A hydraulic motor comprising: a housing portion including a generally cylindrical outer chamber and a generally cylindrical inner chamber adjacent to and in communication with the outer chamber; an annular cam surface on the inner periphery of said outer chamber and including a plurality of cam lobes; a shaft portion journaled in the housing portion and including a hub coaxially disposed within said outer chamber and having a radial valve face; a plurality of radial cylinders in said hub; a piston mounted for reciprocating movement in each of said radial cylinders in response to fluid pressure therein, each piston including cam follower means externally of the hub and engageable with the cam surface to cause rotation of one motor portion relative to the other is response to reciprocating movement of the pistons; a plurality of passages in the hub respectively connecting the closed end of each cylinder to the radial valve face of the hub for transmitting fluid to and from the respective cylinders; a valve manifold having a cylindrical outer periphery coaxially mounted within the inner chamber and having a first radial end face opposite the hub radial valve face with a plurality of angularly-spaced ports opposite the passages in the hub; first and second axially-spaced annular grooves around the valve manifold; first and second housing passage means in the housing respectively connected to the first and second annular grooves; first and second manifold passage means in the manifold respectively connecting the first and second annular grooves to alternate ports on said first radial end face; and hydraulic means associated with the manifold and responsive to fluid pressure in the first or second manifold passage means for biasing the first manifold radial end face against the radial valve face of the hub.

8. The invention defined in claim 7 wherein the valve manifold is annular in shape and has a second radial end face at the end opposite the first radial end face, and the shaft portion includes an axial shaft coaxially extending through the hub and the valve manifold and including a thrust bearing means mounted on the shaft adjacent the second radial end face of the manifold, the hydraulic means exerting an axial force on the thrust bearing means in the opposite direction from the force biasing the said first radial end face of the valve manifold toward the valve face of the hub.

9. The invention defined in claim 8 wherein the valve manifold comprises first and second elements axially shiftable relative to one another to expand the effective axial length of the manifold, the hydraulic means being operative between the first and second elements to bias the elements toward axial expansion of the manifold in response to fluid pressure in either of said manifold passage means.

10. The invention defined in claim 9 wherein the first manifold element includes the first manifold radial end face, and also includes first and second annular intermediate radial faces facing the opposite direction from said first radial end face, the first housing passage means being in fluid communication with the first annular intermediate radial face only and the second housing passage means being in fluid communication with the second annular intermediate radial face only, so that the fluid pressure in the respective housing passage means acting on the respective intermediate faces creates an axial force urging the first manifold radial end face toward the radial valve face on the hub.

11. The invention defined in claim 9 wherein the first manifold element has a plurality of cylindrical bores parallel to the axis of the manifold and the second manifold element includes a plurality of piston means mounted in said bores and operative to engage the thrust bearing means to transmit an axial force thereto in response to pressurization of either the first or second manifold passage means.

References Cited

UNITED STATES PATENTS

| 2,620,736 | 12/1952 | Overbeke. | |
| 3,090,361 | 5/1963 | Orshansky | 91—205 |
| 3,199,297 | 8/1965 | Croswhite | 91—202 |

FOREIGN PATENTS

| 927,826 | 6/1963 | Great Britain. |

PAUL E. MASLOUSKY, Primary Examiner

U.S. Cl. X.R.

91—180, 202